UNITED STATES PATENT OFFICE.

ARTHÈME MATIGNON, OF BOURG-LA-REINE, FRANCE, ASSIGNOR TO THE SOCIÉTÉ GENERALE DES NITRURES, OF PARIS, FRANCE.

PROCESS FOR THE SYNTHETIC PREPARATION OF AMMONIA FROM ITS CONSTITUENTS.

1,089,241.        Specification of Letters Patent.        Patented Mar. 3, 1914.

No Drawing. Original application filed August 7, 1911, Serial No. 642,825. Divided and this application filed May 22, 1913. Serial No. 769,296.

*To all whom it may concern:*

Be it known that I, ARTHÈME MATIGNON, a citizen of the Republic of France, residing at Bourg-la-Reine, Department of the Seine, France, have invented a certain new and useful Process for the Synthetic Preparation of Ammonia from Its Constituents, of which the following is a specification.

This application is a division of an application for patent filed by me August 7, 1911, Serial No. 642,825.

This invention relates to the synthetic preparation of ammonia from its constituent elements, the main object of the invention being to provide means whereby the reaction of nitrogen upon hydrogen may be facilitated at relatively low temperatures, for the purpose of thereby producing the ammonia.

I have discovered that tungsten is a good catalytic agent for the purpose, and I prefer to employ it in a form presenting a large surface for action upon the gases, for example in the form of tungsten powder spread upon the surface of a suitable support capable of being traversed by the gases. Asbestos may be used for such support.

The reaction may be conducted either under ordinary atmospheric pressure or under an increased pressure, which favors the reaction. Instead of tungsten alone, alloys of tungsten may be employed, if sufficiently finely divided to present a large surface.

By way of example, I may pass slowly a mixture of about three parts by volume of hydrogen and one part by volume of nitrogen over finely divided tungsten at a pressure of twenty-five to fifty atmospheres and at a temperature of about three hundred degrees. The mixture of nitrogen and hydrogen employed need not necessarily be taken in the proportions of one volume of nitrogen to three of hydrogen.

I claim as my invention:—

1. A process for the synthetic production of ammonia, comprising the passing of nitrogen and hydrogen over a catalytic agent containing tungsten, at a low temperature, substantially as described.

2. A process for the synthetic production of ammonia, comprising the passing of nitrogen and hydrogen mixture over a catalytic agent consisting of finely divided tungsten, substantially as described.

3. A process for the synthetic formation of ammonia, comprising the passing of nitrogen and hydrogen mixture under pressure, over finely divided tungsten powder spread upon an asbestos support, substantially as described.

In testimony whereof I have signed my name to this specification in the presence of two subscribing witnesses.

ARTHÈME MATIGNON.

Witnesses:
  HANSON C. COXE,
  LEON PEILLET.